UNITED STATES PATENT OFFICE.

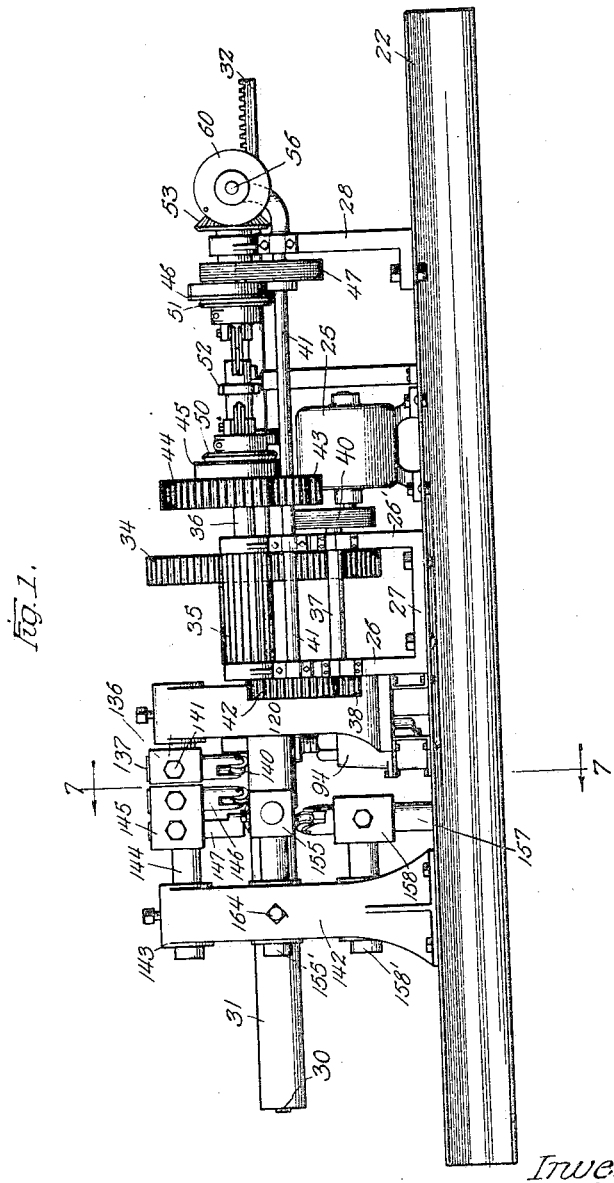

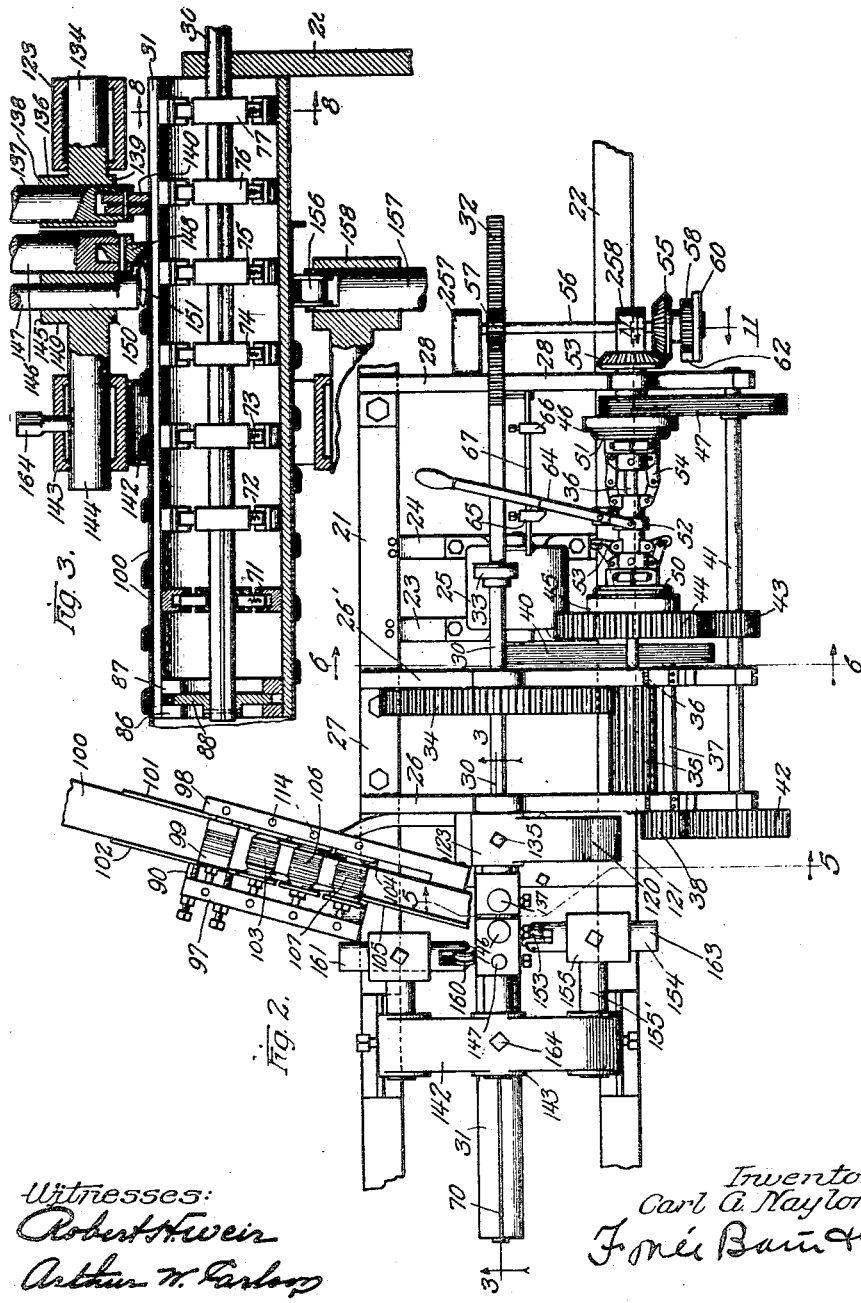

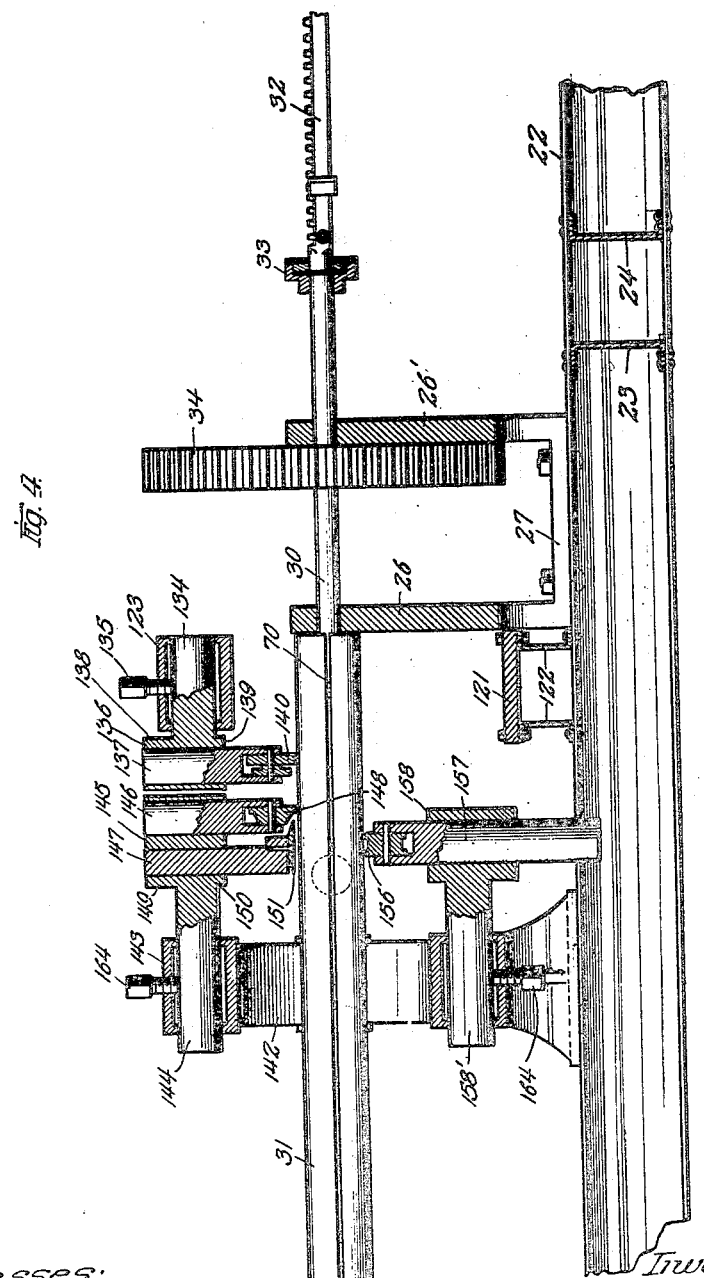

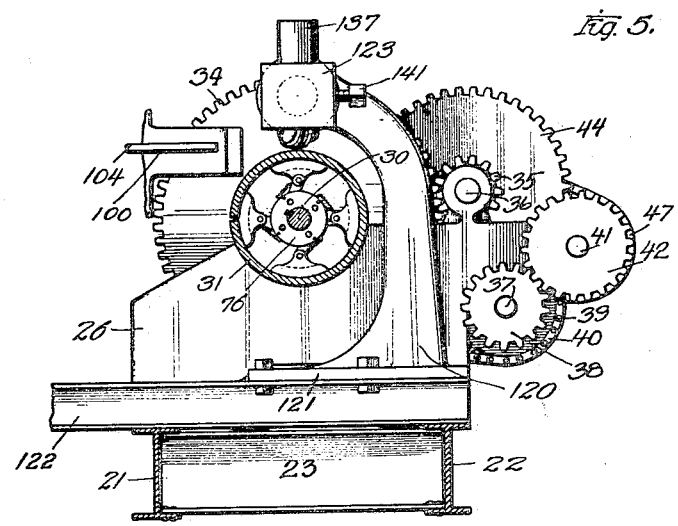
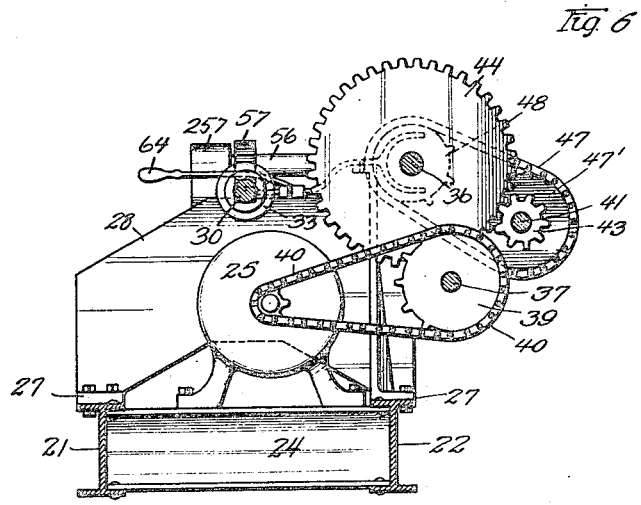

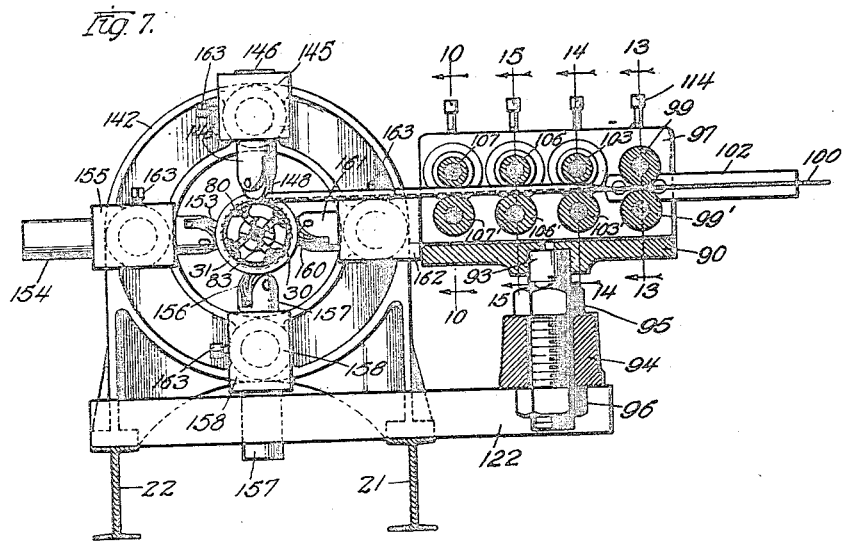
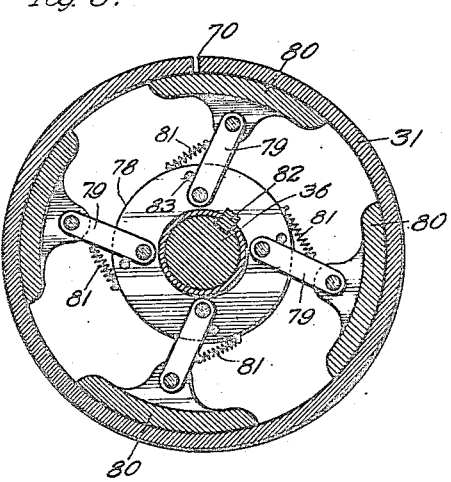

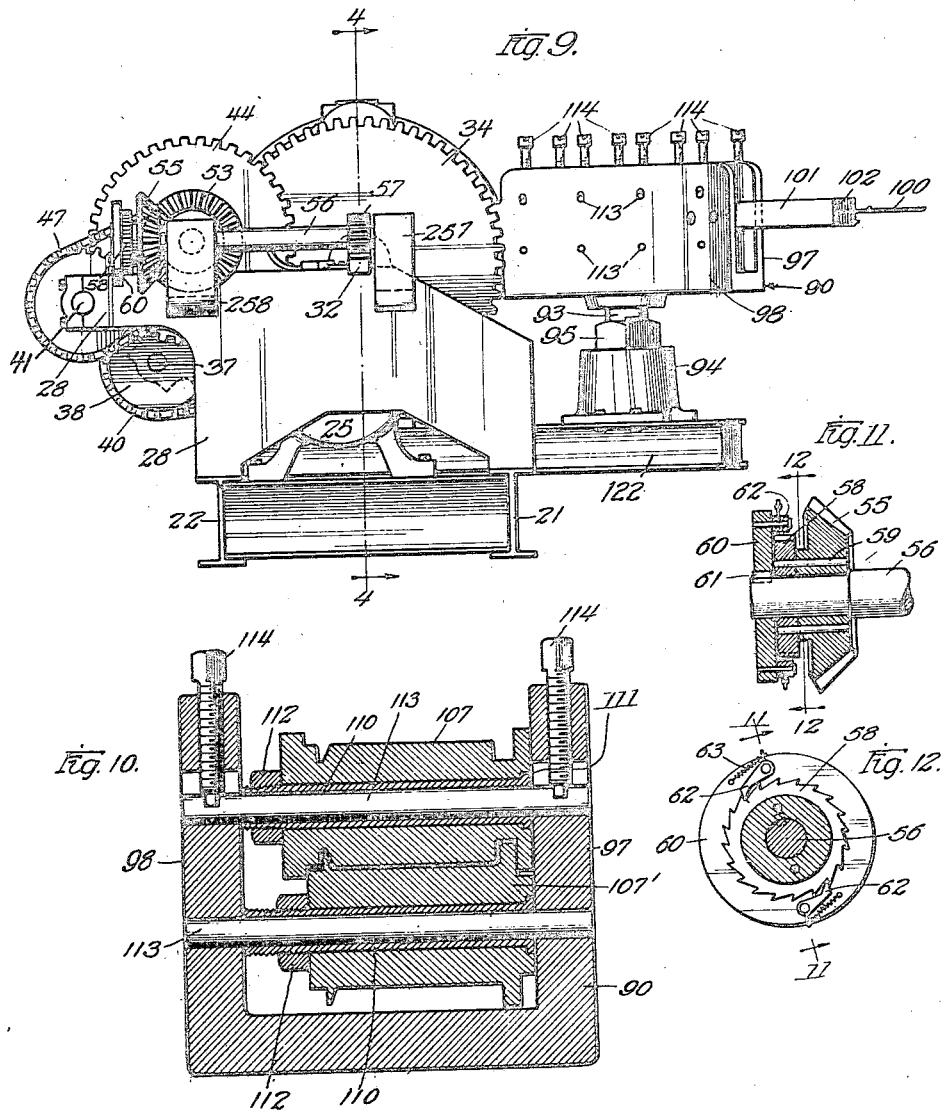

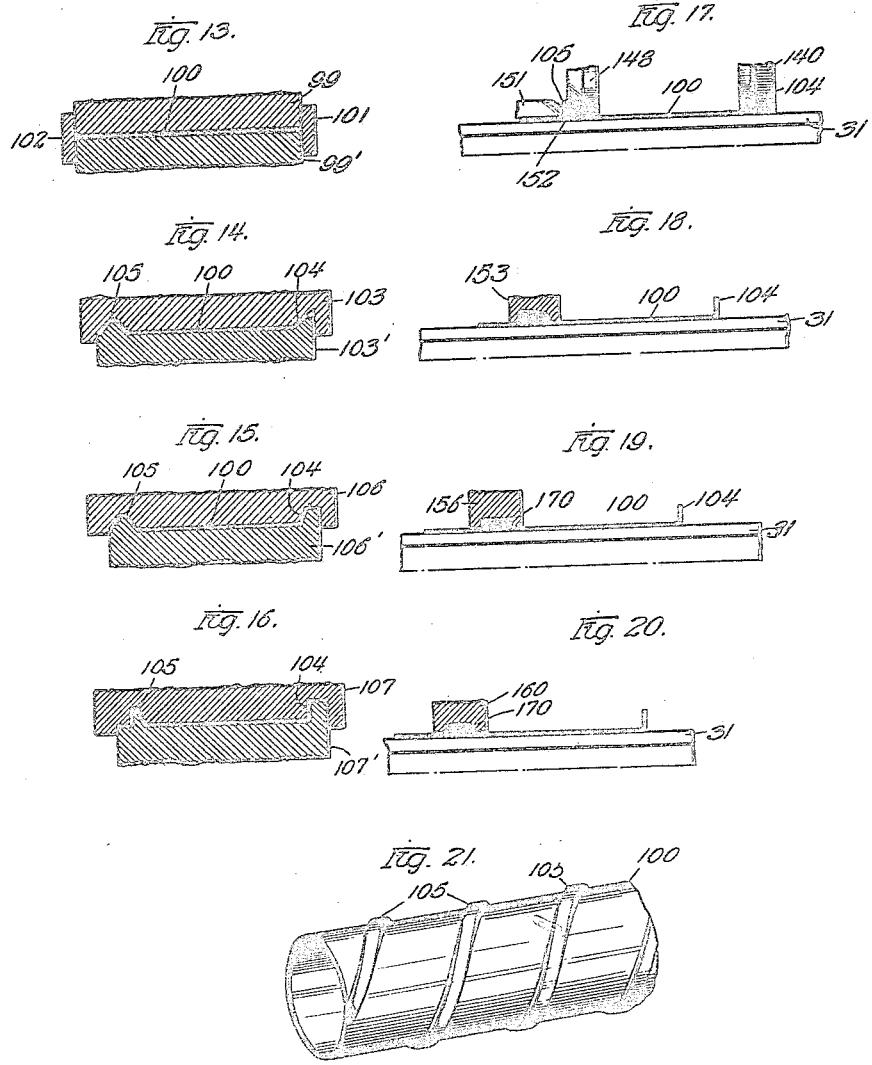

CARL G. NAYLOR, OF CHICAGO, ILLINOIS, ASSIGNOR TO NAYLOR-ROBERTSON COMPANY, OF CHICAGO, ILLINOIS, A CORPORATION OF DELAWARE.

SPIRAL-PIPE-MAKING MACHINE.

1,288,134.   Specification of Letters Patent.   Patented Dec. 17, 1918.

Application filed July 10, 1917. Serial No. 179,657.

*To all whom it may concern:*

Be it known that I, CARL G. NAYLOR, a citizen of the United States, residing at Chicago, in the county of Cook and State of Illinois, have invented certain new and useful Improvements in Spiral-Pipe-Making Machines, of which the following is a specification.

My invention relates to machines for making spiral pipes.

One of the objects of my invention is to provide a machine for making pipes in continuous lengths of any desired linear dimensions from a continuous spirally wound metal strip.

Another object of my invention is to provide a machine capable of adjustment, whereby pipes of different diameters may be made within the practicable capacity of the machine.

A further object of my invention is to provide a machine of this character which will be efficient in operation, is not liable to breakage or derangement, is easily operated and requires little attention.

Other and further objects of my invention will become readily apparent to persons skilled in the art from a consideration of the following description when taken in conjunction with the drawings, wherein—

Figure 1 is a side elevation of the machine.

Fig. 2 is a plan view of the machine.

Fig. 3 is an enlarged sectional view taken on line 3—3 of Fig. 2.

Fig. 4 is a longitudinal sectional view taken on line 4—4 of Fig. 9.

Fig. 5 is a transverse sectional view taken on line 5—5 of Fig. 2.

Fig. 6 is a transverse sectional view on line 6—6 of Fig. 2.

Fig. 7 is a transverse sectional view taken on line 7—7 of Fig. 1.

Fig. 8 is an enlarged vertical sectional view of the expandible mandrel about which the pipe is coiled, taken on line 8—8 of Fig. 3.

Fig. 9 is an end elevation of the machine.

Fig. 10 is an enlarged axial sectional view of one pair of strip forming rolls taken on line 10—10 of Fig. 7.

Fig. 11 is a sectional view on line 11—11 of Figs. 2 and 12.

Fig. 12 is a transverse sectional view on line 12—12 of Fig. 11.

Fig. 13 shows in section fragments of a pair of flat guide rolls, the section being taken on lines 13—13 of Fig. 7.

Fig. 14 is a similar view of the strip beading and flanging rolls in a sectional view taken on line 14—14 of Fig. 7.

Fig. 15 is a similar view of a pair of strip forming rolls, taken on line 15—15 of Fig. 7.

Fig. 16 is a similar view of a pair of strip forming rolls taken on line 10—10 of Fig. 7.

Fig. 17 shows fragments of the tucking, deflecting and guide rolls as they appear in section in Fig. 4.

Figs. 18, 19 and 20 are fragments of the seam flattening and pipe feeding rolls, as shown in Fig. 7, and;

Fig. 21 is a perspective view of a section of finished pipe.

In all the views the same reference characters are employed to indicate similar parts.

In carrying my invention into effect I provide a rotatable mandrel upon which the metal strip or skelp is to be spirally wound, to form a pipe, or tube. Regulable lengths of the pipe or tube, are formed upon the mandrel, by successive convolutions of the skelp as the mandrel is axially moved to the limit of its travel, after which the mandrel is axially retracted or rearwardly reciprocated to its initial position for the commencement of another cycle of operation.

The mandrel is automatically capable of diametric contraction by the act of reversing the direction of its rotation, so that it may easily be reciprocated within the finished parts of the pipe, to its initial location, to continue the pipe forming operation. The reversal of direction of rotation of the mandrel not only causes its diametric contraction but also sets into operation the driving means necessary for its retraction. After the mandrel has been retracted the direction of rotation of the mandrel is again reversed, to draw the skelp forward through the several skelp forming rolls, to continue the formation of another section of pipe. The reversal in direction of rotation of the mandrel, to draw the skelp forward affects the mandrel expanders to cause the front end thereof to expand to the exact dimensions of the inner diameter of the finished pipe. Stops are provided on the front mandrel expanding instrumentalities whereby the effect of the expanding means is limited to provide constant and uniform diameter of the front part of the mandrel upon which the skelp is being received, and formed into the pipe. The expanders in the rear end of the mandrel, which are at all times within a finished part of the pipe, are not so limited, and may be expanded to any extent permissible by the inner surfaces of the finished pipe to obtain a firm, frictional driving contact therewith. The front portion of the mandrel upon which the strip to form the tube is initially received is, for the reasons stated above, maintained at constant, uniform diameter during the pipe forming operation, and is only contracted just prior to its retrograde axial movement. The mandrel is the driving or pulling means by which the skelp is brought forward, and therefore the latter is tightly wrapped thereabout to produce a pipe of smooth uniform diameter. While the strip is being drawn through the rolls that flange a crimp on its longitudinal edges, the adjacent edge of the convoluted strip is tucked in and interlapped by other rolls as it is received on the mandrel, and other rolls deflect and compress the seam thus formed on the outside of the pipe.

In the embodied exemplification in which I have chosen to disclose my invention, the base frame upon which the machine is mounted is composed of two parallel I beams 21 and 22, secured together and spaced apart at suitable intervals by cross beams 23 and 24. An electric motor 25, for driving the machine, is mounted upon the cross beams 23 and 24. A frame member having upstanding plates 26—26' for supporting the mandrel is secured to the I beams 21 and 22, as at 27, and another frame member 28 is, in the same manner, secured to the I beams 21 and 22 at the front end of the machine. Mounted in the standards 26 and 26' of the frame is the mandrel rotating shaft 30, which is capable of both rotation and reciprocation, and which carries on its rearwardly extending end the expanding mandrel 31, and at its opposite end is connected to a reciprocatable rack 32. A joint 33 between the rack 32 and shaft 30, permits the shaft to rotate independently of the rack, the reciprocation of which causes axial movement of the rotatable mandrel carrying shaft 30. A gear wheel 34 is secured to the shaft 30 between the frame members 26—26' and is shown in Fig. 4 in the position it occupies when the mandrel 31 is fully retracted. The gear wheel 34 is driven by an elongated pinion 35 which it traverses from end to end and which is supported upon a shaft 36 journaled in the frame members 26—26'. Another shaft 37 is supported in the frame members 26—26', and is provided on its outer end with a pinion 38 and on its inner end with a sprocket 39, which is connected to a sprocket on the shaft of motor 25 by means of a link belt 40. Another shaft 41 is journaled in the frame members 26—26' and 28, and carries on its outer end a gear wheel 42 which meshes with the pinion 38. The shaft 41 also carries a pinion 43 which meshes with a gear wheel 44 loose on the shaft 36. A sprocket wheel 48 loose on shaft 36 is connected by the link belt 47 to sprocket 47' on shaft 41. Secured to the gear wheel 44 is a clutch member 45, for coöperation with the clutch member 50 rotatable with, but slidable on shaft 36. Another clutch member 46 is carried by sprocket 48 and coöperates with clutch member 51, rotatable with, but slidable on shaft 36. A slidable clutch operating member 52, is connected to the clutch members 50 and 51 by link connections 53 and 54, respectively, so that when the slidable member 52 is pushed to the position shown in Fig. 2, the shaft 36 is rotated in such a direction as to wind the skelp about the mandrel and while this is being done the clutch member 46 is rotated idly by the belt 47. The shaft 30 will move forward, being impelled by the spiral thread on the pipe in engagement with the flanging rollers, until the gear wheel 34 has traversed the space between the frame members 26 and 26' along the surface of the elongated pinion 35.

The means for moving the shaft 30 axially to retract the mandrel comprises a beveled gear wheel 53 fixed to the front end of shaft 36 and which meshes with a similar beveled gear wheel 55 rotatably carried on one end of a transverse shaft 56 supported in brackets 257—258 projecting from the frame member 28. Carried on the other end of the shaft 56 is a pinion 57 which meshes with the rack 32. The beveled gear pinion 55 carries a ratchet wheel 58 to which it is secured by means of pins 59. The ratchet wheel and the pinion are both loose upon the shaft 56. A disk 60 is secured to the shaft, as by a key 61 and is provided with pawls 62, which are yieldingly held in contact with the teeth of the ratchet wheel by springs 63, so that when the shaft 36 is rotated in one direction, the pawls 62 engage the ratchet teeth on the wheel 58 and the shaft 56 is rotated to withdraw the mandrel, and when the shaft 56 is rotated in the opposite direction by the forward axial movement of the mandrel, the pawls 62 pass idly over the ratchet teeth of the disk 58 and are free from engagement with the beveled gear wheels.

The arrangement is such that when the shaft 30 is fed forwardly, by the winding of the strip or skelp upon the expanding mandrel 31, the spiral inclination of the strip, as it is being wound, is the means for feeding the shaft 30 and mandrel 31 axially in a forward direction, the shaft 56 will then be rotated idly by the pinion 57 without connection with the pinion 55. When the mandrel is to be returned to its initial position, however, the direction of rotation of the pinion 53 is reversed and the disk 60 will be rotated in such direction as to rotate the shaft 56 by the operation of the ratchet wheel 58 and the pawl 62. The direction of rotation of the geared pinion 53 may be reversed by movement of the hand-lever 64, which shifts the clutch operating part 52 axially of the shaft 36. Instead of moving the handle 64 manually, adjustable stops 65 and 66 in the path of the movement of the handle 64 may be arranged to reverse the direction of rotation of the shaft 36 at suitable predetermined intervals. The stops 65 and 66 are arranged along a rod 67 carried by the rack 32 and adapted to be adjustably located at any point, whereby to vary or control the length of pipe that may be wound upon the mandrel 31 before the mandrel is reversed and axially reciprocated to its initial position, prior to continuing the pipe forming operation.

The expanding mandrel 31 consists of a tube or shell slotted longitudinally, as at 70, and mounted upon a series of axially spaced apart shell expanding spiders 71 to 77 inclusive. Each of these supports consists, substantially, of a disk 78 secured by key 82 to shaft 36 and having a plurality of pivoted arms 79 extending therefrom, and carrying on their free ends shoes 80, the outer surfaces of which are curved for conformity with the interior of the mandrel. Each arm is provided with a spring 81 connected at its opposite end to the disk 78 and tending to draw its coöperating arm into a substantially radial position. The mandrel-expanding spider supports, 75 to 77, inclusive, or those that are not immediately under the wound strip, at the time when the pipe is being formed, or after it has been formed, are each provided with limiting stops or pins 83, so as to prevent the respective shoes 80, from reaching the position which would expand the mandrel 31 to a diameter greater than that of the pipe to be formed. The other expanding spiders 71 to 74 inclusive, are not provided with stops 83. The extent to which the latter expanders can be moved, during strip winding operation, being limited only by the internal diameter of the pipe that has been completed, and the frictional engagement of the part of the mandrel expanded by these agencies with the interior of the pipe, that serves as means for drawing the strip forward, as the frictional engagement of the major portion of the expanding mandrel is affected by these pipe contained, expanding devices. The object of placing the stops 83 upon the mandrel expanders 75 to 77 inclusive is to maintain a uniform diameter of this strip receiving portion of the mandrel so that the diameter of the pipe throughout its entire length will always be uniform. Otherwise the expanders would tend to increase the diameter of the pipe at each reciprocation of the expanding mandrel. On the outer end of the mandrel 31 are secured two spaced apart rings 86 and 87 between which is a disk 88 secured to the shaft 30, whereby the mandrel may be axially moved.

A strip guide frame 90 is mounted upon a threaded stem 93 that passes through a portion 94 of the base. The frame 90 may be adjustably swiveled on the stem or it may be raised and lowered therewith by operation of the nuts 95 and 96. The frame consists of a bottom portion and two side portions constituting the base and vertical walls 97 and 98.

In the machine shown there are four sets or pairs of rolls mounted in the strip support. The first, or receiving rolls 99 and 99' I employ to flatten and tension the strip 100. On either side of these rolls, and extending some distance back of the support, are guide plates 101 and 102. The strip then passes in between the rolls 103, 103', by which the flange 104 on one edge of the strip, and the bead 105 on the other edge of the strip is being formed. It then passes between the rolls 106, 106' which continues the flange and bead forming operation. The strip 100 then passes between the last set of rolls 107, 107' which completes the formation of the flange 104 and bead 105. Each of the rolls is preferably secured to a threaded sleeve 110 having a head 111 at one end, its opposite end being threaded to receive a clamping nut 112. By making the roll rotatable with a sleeve, to which it is fixed, the sleeve may be removed when the bearing provided thereby has been worn and a new sleeve substituted. The rolls are each mounted upon an arbor 113 secured in the walls 97, 98, the position of the upper arbors with respect to the lower being regulable by means of screws 114.

The metal strip having been formed, as it advanced toward the mandrel, with a bead on one edge and a flange on its other edge must next be wound spirally about the mandrel and the flanged edge interlocked with the bead on the next adjacent convolution. The instrumentalities for causing this interengagement of the edges are positioned around the mandrel for successively performing the progressive steps necessary to the formation of the completed article.

A standard 120 is mounted upon a plate 121 that is supported upon cross sills or channel bars 122 and is provided with a head 123 directly above the axial center of the shaft 30. An arm 134 is supported in the head 123 and locked in position by the set screw 135. The arm 134 is provided on its outer end with a head 136 to receive the vertically adjustable roll-holding stem 137. The head 136 projects farther from the axis of the arm 134, as at 138, than it does on the other side of the axis, as at 139, so that when a pipe of smaller diameter than that of the mandrel shown is to be made, then the longer portion 138 of the head may be turned toward the pipe and greater supporting strength for the vertical stem 137 is thus afforded. The head 136 may be rotated on the arm 134 and secured in adjusted position by the set screw 135. The roller 140, shown pivoted in the lower portion of the stem 137 is the receiving roller for the vertically inclined flange 104 of the strip 100 as the strip is about to be wound around the mandrel 31. The strip 100 and the flange 104 is shown in position with reference to the mandrel and roller 140, in Fig. 17. The vertical stem 137 is adjusted in the head 126 and is locked in adjusted position by a set screw 141. The axis of the roller 140 is inclined with reference to the axis of the mandrel 31, as shown in Fig. 5, to correspond with the spiral course taken by the seam of the strip as it is wound upon the mandrel.

An annular frame, or support 142, is mounted upon the I beams 21 and 22, constituting the base of the machine, and is arranged coaxially with the mandrel 31. A head 143 located at the top of the frame 142, receives a horizontal arm 144, (Fig. 3) the inner end of which is provided with a head 145 for two vertically extending and adjustable stems or bars 146 and 147. The stem 146 has pivoted on its lower end a roller 148, the office of which is to deflect the bead 105 of the strip 100, after the flange 104 of the adjacent strip edge has been received within the bead. This is shown very clearly in Fig. 3, and also in Fig. 17. The head 145 is also provided with an elongated part 149, which extends farther from the axis than the part 150 on the other side of the axis, for the same purpose as explained with reference to head 136. The stem 147 has pivoted at its lower end, on a substantially vertical axis, a tucking roller 151, the office of which is to hold into substantial contact with the flange 104 the outer free edge 152 of the bead 105, as more clearly shown in Fig. 17.

When the bead 105 is being deflected prior to being flattened out by subsequent operation, the vertically extending flange 104 is held by roller 140 or a similar guide or support in its proper upright position, while it is undergoing the stretching operation incident to the strip being coiled around the mandrel. After the strip has passed under the rolls 140—148 and 151, it then passes under the roll 153 which is pivoted on a horizontally movable stem 154 supported in a head 155 of the arm 155'. This roll also occupies an angular position with reference to the axis of the mandrel, to coöperate with the inclination of the seam of the pipe being made and serves to further flatten the seam, as shown in Fig. 18. Another similar roller 156 is pivoted in the end of the stem 157 which is supported in the head 158 of the arm 158' projecting from the frame 142 and still further flattens the seam. Still another roller 160 pivoted in a horizontally movable stem 161 that is carried by the head 162 of the frame, gives a final finish to the seam. The inclined rollers while they perform their seam making functions also serve as means for feeding the pipe and mandrel 31 forwardly as the strip is drawn spirally around the mandrel for the purpose of making the pipe.

These roller carrying bars are adjustable in their respective heads and are secured therein by set screws 163, the head carrying stems upon which they are supported being adjustable in the head of the frame 142 by set screws 164.

The operation of the device is substantially as follows. The leading end of a strip of metal 100, which is of uniform width, throughout its entire length, is cut narrower than the major portion of the strip so that it will pass freely through the rollers 99 to 107 inclusive without having its edges deflected, as in the finished strip, and the feeding end is fastened to the mandrel 31 in suitable manner. The mandrel is then in its retracted position and the shaft 30 which carries it is being rotated by the gear wheel 34 and the elongated pinion 35. The strip will now be drawn through the rolls by the rotation of the mandrel and the wide portion or strip will pass the flattening rolls 99, 99' and engage the rolls 103, 103' which begins the formation of the bead and the flange on its respective edges. After it has passed the rolls 107 and 107', the bead and flange have been completely formed, and it will then pass to the mandrel and be received by the rolls 140 and 148, the former engaging both sides of the flange, and the latter deflecting the bead 105. As the strip passes around the mandrel 31 the flange on the edge of the succeeding convolution will enter the bead 105 of the following convolutions whereupon the tucking roll 151 will hold the outer edge 152 of the bead 105 up against the flange 104 while the roll 148 deflects the bead and flange from the vertical to an angular position, after which the roller 153 further deflects the seam thus started. The roller 156 bearing upon the mandrel continues the process of flattening the seam and the roller 160 completes the operation, as shown in Fig. 10. The seam thus formed, passing under the rollers 148, 153, 156 and 160, in the order named, will operate to feed the mandrel and the finished pipe forwardly as the strip is wound upon the mandrel.

While this is going on the shaft 30, the gear wheel 34 and the rack 32 move coincidentally in an axial direction with the mandrel 31. As the rack 32 rotates the pulley 57 and the shaft 56, the ratchet mechanism consisting of the ratchet wheel 58 and the pawl 62 will prevent such motion being interfered with by the rotation of shaft 36. During the progress of the shaft 30 and the mandrel 31 the stop 66 which is fixed to the rack 32 will be moved over to the left until it strikes the lever 64 at which time the gear wheel 34 has moved over to the left end of the pinion 35. When the lever 64 is moved in the manner described, the clutch 45 is disengaged and the clutch 46 is engaged, so that the shaft 36 is now rotated in an opposite direction and since the shaft 36 carries a pinion 35 the gear wheel 34 is thereby rotated in an opposite direction. This will cause the shaft 56 to be rotated so that the pinion 57, meshing with the rack 32, will draw the rack, the shaft 30 and the mandrel 31, backwardly into the position they formerly occupied, causing the stop 65 to engage the lever 64 and reverse the operation again. The lever 64 may be operated by hand for performing this operation to determine the length of pipe that is made at a single reciprocation of the mandrel. When the direction of rotation of the mandrel is reversed, in the manner described, so as to retract the mandrel, it is necessary to free it from the inner surface of the pipe which is tightly wound around the mandrel in the progress of the strip. By reversing the direction of rotation of the shaft 36, the shoes 80 of the expanding structure 78 will no longer make driving contact with the shell of the mandrel 31 and therefore the mandrel, being circumferentially resilient will be contracted and relieve itself from contact with the interior of the finished pipe so that it may be freely withdrawn.

The disk 87 connected to the mandrel and the disk 88 connected to the shaft provide means for axially moving the mandrel with the shaft. After the shaft has been retracted and when it is rotated in clockwise direction, with reference to Fig. 8, the shoes 80 will be forced outwardly to expand the mandrel. In the expanders 75, 76 and 77 the outward movement of the shoes is limited by the pins 83 but the other expanders are limited only by the interior diameter of the pipe so as to secure a firm strong grip between the mandrel 31 and the interior of the pipe. By the operation disclosed, consisting in projecting the mandrel a definite distance and coincidentally completing a coördinate length of pipe and then retracting the mandrel a pipe of any desired length may be produced by the operation of my machine. The strips 100 may be welded end for end, as they are wound upon the mandrel so that there is practically no limitation to the length of pipe that may be made by the machine.

It will be observed that the interior of the pipe is smooth so that the seam being entirely on the outside surface of the pipe does not offer any obstructions to fluids or other substances.

Whereas I have illustrated and described but a single embodiment of my invention it will be evident to those skilled in the art that various modifications may be made therein without departing from the spirit of the invention or the scope of the appended claims.

Having described my invention, what I claim is:—

1. A machine for making pipe from a spirally wound strip, comprising a rotatable diametrically expandible mandrel upon which the strip is wound, means for rotating the mandrel, means to reverse the direction of rotation of the mandrel, and means to expand the mandrel while being rotated in one direction.

2. A machine for making pipe from a spirally wound strip, comprising a diametrically expandible mandrel upon which the strip is wound, rolls for forming the strip upon the mandrel, means for moving the mandrel and rolls with respect to each other on lines parallel with the axis of the mandrel, and means to expand the mandrel while the relative movement of the rolls and mandrel is in one direction.

3. A machine for making pipe from a spirally wound strip, comprising an axially movable diametrically expandible mandrel upon which the strip is wound, means for rotating the mandrel and drawing the strip thereabout, means for moving the mandrel axially in one direction, and means for contracting the mandrel prior to its axial movement operable by the same means that rotates the mandrel.

4. A machine for making pipe from a spirally wound strip, comprising an axially movable diametrically expandible mandrel upon which the strip is wound, means for rotating the mandrel and drawing the strip thereabout, means for moving the mandrel axially in one direction, to retract it, and automatically operable means for contracting the mandrel prior to its retracting movement, and to expand it at the completion of its aforesaid retracting movement.

5. In a machine for making pipe from a spirally wound strip, a rotatable diametrically expandible mandrel, upon which the strip is to be wound, means to rotate the mandrel, means to reverse direction of rotation of said mandrel and means to expand the mandrel while rotated in one direction and to contract it while rotated in the opposite direction.

6. In a machine for making pipe from a spirally wound strip, a rotatable axially movable diametrically expandible mandrel, upon which the strip is to be wound, means to rotate the mandrel, means to reverse direction of rotation of the mandrel and to return it to its initial position, and automatically operable means to expand the mandrel before being advanced and to contract it before being returned.

7. In a machine of the character described, a self-contractible, rotatable, axially-movable mandrel member to receive a strip of which a pipe is to be made, the mandrel being advanced axially as the pipe is formed; means to return the mandrel axially to its initial position when contracted; means to expand that portion of the contractible mandrel member withdrawn from the finished pipe to a definite extent, and means to expand that portion of said member remaining in the pipe, into tight driving engagement with the interior of the pipe.

8. In a machine of the character described, a self-contractible mandrel member to receive a strip of which the pipe is to be formed, the pipe and mandrel member being advanced axially as the pipe is formed; means to return said mandrel member axially to its initial position after being permitted to contract; means to expand said mandrel member, and means limiting the extent of expansion of that portion of said member withdrawn from the finished pipe.

9. A rotatable mandrel upon which a strip is to be wound for the formation of a pipe, means to expand the mandrel while rotated in one direction and to contract the same while rotated in the other direction and means to rotate the mandrel in alternate directions.

10. A rotatable axially movable mandrel upon which a strip is to be wound for the formation of a pipe, means to rotate the mandrel in one or the other direction and to expand it and to contract it respectively, means for reciprocating the mandrel axially and actuating means for changing the direction of rotation and the axial movement of the mandrel.

11. A rotatable expandible axially movable mandrel upon which a strip is wound for the formation of a pipe, means for expanding or contracting the mandrel actuated by change of direction of rotation of the mandrel and means for rotating the mandrel in one or the other direction.

12. A machine for making pipe from a spirally wound strip comprising an axially movable mandrel upon which the strip is wound, a gear carried by the mandrel, an elongated pinion meshing with the gear, and means for automatically reversing the axial movement of the mandrel and for changing its diameter respectively when the gear approaches the end of its travel on the elongated pinion.

13. A machine for making pipe from a spirally wound strip comprising an axially movable mandrel upon which the strip is wound, a gear carried by the mandrel, an elongated pinion meshing with the gear, means for automatically contracting the mandrel while in motion, and means for reversing the axial movement of the mandrel and actuating the contracting mechanism when the gear approaches the end of its travel on the elongated pinion.

14. In a machine of the character described, an expandible rotatable mandrel upon which a strip is wound to form a pipe, means to rotate said mandrel whereby to pull the strip between edge forming rolls and wrap it about said mandrel to make a pipe, rolls between which the strip is pulled to form a substantially vertical flange on one edge and an outwardly projecting bead on the other edge, a roll to maintain the flange in vertical plane while being received by the mandrel, a roll to tuck under and hold the free edge of the bead in contact with the flange while the seam is being deflected, and one or more rolls coöperating with the mandrel to deflect and flatten the seam thus formed, said rolls coöperating with the seam to feed the pipe axially.

15. In a machine of the character described, an expansible rotatable mandrel upon which a strip is wound to form a pipe, means to rotate said mandrel whereby to pull the strip between edge forming rolls and wrap it about the mandrel, rolls between which the strip is pulled to form a substantially vertical flange on one edge and an outwardly projecting bead on the other edge, a roll to maintain the flange in vertical plane while being received by the mandrel, a roll to tuck under and hold the free edge of the bead in contact with the flange while the seam is being deflected, one or more rolls coöperating with the mandrel to deflect and flatten the seam thus formed, and automatically operable means to contract the mandrel to permit relative axial movement of said mandrel and pipe.

16. In a machine of the character described, an expansible rotatable mandrel upon which a strip is wound to form a pipe, means to rotate said mandrel whereby to pull the strip between edge forming rolls and wrap it about said mandrel, rolls between which the strip is pulled to form a substantially vertical flange on one edge and an outwardly projecting bead on the other edge, a roll to tuck under and hold the free edge of the bead in contact with the flange while the seam is being deflected, and one or more rolls coöperating with the mandrel to deflect and flatten the seam thus formed, said seam-forming rolls having side flanges to engage the seam and feed the pipe axially as it is formed.

17. In a machine of the character described, an expansible rotatable mandrel upon which a strip is wound to form a pipe, means to rotate said mandrel whereby to pull the strip between edge forming rolls and wrap it about said mandrel, rolls between which the strip is pulled to form a substantially vertical flange on one edge and an outwardly projecting bead on the other edge, a roll to tuck under and hold the free edge of the bead in contact with the flange while the seam is being deflected, one or more rolls coöperating with the mandrel to deflect and flatten the seam thus formed, and automatically operable means to remove the mandrel axially from a finished section of pipe for the commencement of a new section.

18. In a machine of the character described, a driven mandrel about which to wind a strip to form a pipe, a series of rolls through which the strip is pulled to form an outwardly extending bead on one edge and a flange on the other edge, a deflecting roller to turn over the seam when the flange of one convolution is within the bead of an adjacent convolution, other flanged rollers spaced apart around the mandrel and overlying the seam to flatten the seam and to axially move the finished pipe and mandrel, means to disengage the mandrel from the pipe, and to reëngage them and means to return the mandrel to its initial position.

19. In a machine of the character described, a driven mandrel arranged to wind a strip in spiral convolutions thereabout to form a pipe, means for forming a flange at the meeting edges of the strip, a flanged roller overlying the seam to flatten the same and to move the mandrel and pipe thereon axially, and means to return the mandrel in its axial path without correspondingly moving the pipe.

20. In a machine of the character described, a driven mandrel arranged to wind a strip in spiral convolutions about itself to form a pipe, means for forming a seam at the meeting edges of the strip, a series of flanged seam pressing rollers spaced at intervals along the seam to axially move the mandrel and pipe as the strip is wound, means for engaging the pipe and mandrel during seam forming operation, means to disengage said pipe and mandrel, and means to return the mandrel to its initial position.

21. In a machine of the class described a diametrically contractible, rotatable mandrel and means independently and automatically rotatable about the same axis for expanding said mandrel.

22. In a machine of the class described a one piece, diametrically contractible rotatable mandrel; means to rotate the mandrel and automatically operable means between the mandrel and rotating means to expand the mandrel.

23. In a machine of the class described a one piece automatically and diametrically contractible, rotatable mandrel; means to rotate the mandrel and automatically operable means between the mandrel and rotating means to expand the mandrel when the latter is rotated in one direction and to permit its contraction when rotated in the opposite direction.

24. In a machine of the class described, a contractible mandrel comprising a contractible tube split longitudinally from end to end; a shaft inside said tube for rotating it; supporting means for said tube between said tube and shaft whereby the initial rotative movement of said shaft in one direction will expand said tube by operation of said supporting means and initial rotative movement of said shaft in the opposite direction will permit its contraction.

25. In a machine of the class described, a rotatable, diametrically expandible strip-receiving means, upon which to spirally wind a strip to form a pipe; expanders to expand said means into driving relation with said pipe and other expanders to expand said means to a predetermined diametric size, upon which to receive the strip.

In testimony whereof I hereunto set my hand.

CARL G. NAYLOR.